United States Patent
Wu et al.

(10) Patent No.: US 7,336,888 B2
(45) Date of Patent: Feb. 26, 2008

(54) METHOD AND APPARATUS FOR PERFORMING CONTINUOUS CAPTURE DURING RECORDING REAL-TIME DATA

(75) Inventors: Samuel Wu, Chang-Hua (TW); Steve Chen, Taipei (TW)

(73) Assignee: Ulead Systems, Inc., Taipei (TW)

(*) Notice: Subject to any disclaimer, the term of this patent is extended or adjusted under 35 U.S.C. 154(b) by 1107 days.

(21) Appl. No.: 10/421,741

(22) Filed: Apr. 24, 2003

(65) Prior Publication Data

US 2004/0213103 A1    Oct. 28, 2004

(51) Int. Cl.
*H04N 5/76*  (2006.01)
*H04N 7/00*  (2006.01)
*H04N 5/00*  (2006.01)

(52) U.S. Cl. .................................. 386/95; 386/125

(58) Field of Classification Search .............. 386/1, 386/45–46, 95, 125–126; 369/47.23, 47.24, 369/47.33, 47.34

See application file for complete search history.

(56) References Cited

U.S. PATENT DOCUMENTS

| | | | |
|---|---|---|---|
| 6,370,318 B1 * | 4/2002 | Iwaki | 386/94 |
| 6,538,692 B2 * | 3/2003 | Niwa | 348/231.1 |
| 7,177,530 B1 * | 2/2007 | Suzuka | 386/124 |

* cited by examiner

*Primary Examiner*—Thai Q. Tran
*Assistant Examiner*—Nigar Chowdhury
(74) *Attorney, Agent, or Firm*—Rosenberg, Klein & Lee

(57) ABSTRACT

An encoder encodes the captured real-time data into a program stream. A disk authoring transforms the program stream into a disk file format. A disk writer records the disk file format on an optical disk, wherein the disk writer further includes at least two recording speeds. A buffer temporarily stores the program stream or the disk file format during the disk writer stopping the recording action. A sending-path controller notified by the disk writer to switch the data flow between the disk authoring or the disk writer and the buffer, wherein the sending-path controller also can notify the disk writer to switch the recording speeds.

16 Claims, 4 Drawing Sheets

METHOD AND APPARATUS FOR PERFORMING CONTINUOUS CAPTURE DURING RECORDING REAL-TIME DATA

BACKGROUND OF THE INVENTION

1. Field of the Invention

This invention generally relates to the field of seamless capture. More particularly, the present invention relates to a method and apparatus performing continuous capture during recording real-time data.

2. Description of the Prior Art

Nowadays, video recorders can basically be grouped into the analog type, such as a tape video recorder, and the digital type, such as a compact disk (CD) and a digital video/versatile disk (DVD) video recorder etc., according to the recorded data formats and the use of storage media. Generally speaking, a digital video recorder performs better than an analog one in providing image and sound quality. One of the reasons is that the capacity of storage media used for digital video recorders is far bigger than those used for analog recorders. Hence, the storage media used for the digital video recorders, such as CD disks and DVD disks etc., can be used to record much more data for enhancing the qualities of images and the articulation of sound as well to extend the recording time.

However, a recorded program sometimes outruns the recording time and makes a storage medium full although the storage medium has a larger capacity. For example, a user may want to record a live TV program with data amounts that exceed the capacity of the possible storage media such as videotape cassettes, CD disks or DVD disks, etc. In this situation, the user needs to stop the video recorder from capturing the program while the storage medium is full, replacing the full storage medium with a new formatted one, and then resumes the video recorder capturing action thereafter. By doing so, the program exceeding the capacity of the storage medium can be just carried on recording. But, the problem is that real-time data is lost during exchanging the storage medium. Furthermore, the issue in a digital video recorder is worse than that of an analog one since the storage medium, such as a CD disk or a DVD disk, needs to be finalized when it is full. Hence, real-time data is totally lost during performing the action of finalizing and exchanging the storage medium.

As shown in FIG. 1, a schematic block diagram for recording continuous real-time data is illustrated. An encoder 100 encodes the captured video data 101 and audio data 102 into a video/audio program stream 103. The video/audio program stream 103, then, is transformed into a disk file format 104 by a disk authoring 110, so that the disk file format 104 can be recorded on a disk 130 via a disk writer 120. However, the continuous real-time data exceeding the capacity of the disk 130 is lost during the disk 130 being full, finalized and exchanged until a new disk is inserted and the recording action is resumed. In other words, this situation causes discontinuous recording between the disk 130 and the new disk.

Another schematic block diagram for recording continuous data is shown in FIG. 2A. An encoder 100 encodes the captured video data 101 and audio data 102 into a video/audio program stream 1031. The video/audio program stream 1031, then, is temporarily stored in a hard disk buffer 140. The two processes are kept going until the whole video data 101 and audio data 102 are captured and encoded into the video/audio program stream 1031 and stored in the hard disk buffer 140. Similarly, the video/audio program stream 1031 is transformed into a disk file format 104 by a disk authoring 110 and then the disk file format 104 is recorded on a disk 130 through a disk writer 120 while a recording action is started. By following these procedures, the continuous real-time data exceeding the capacity of the disk 130 is not lost while the disk 130 is full, finalized and exchanged. This is because all the data is already temporarily stored in the hard disk buffer 140 before any recording action has been started. However, the whole procedure takes more time than a real-time recording procedure does since the recording action in the procedure does not simultaneously work with the capturing action. Therefore, the disk authoring 110 and the disk writer 120 are idle until all the data being stored in the hard disk buffer 140 and the recording action being started.

Still another schematic block diagram for recording continuous data is shown in FIG. 2B. Most processes in FIG. 2B are similar to those in FIG. 2A. The difference is that a video/audio program stream 103 is not directly stored in a hard disk buffer 140 but after being transformed into a disk file format 1041 by a disk authoring 110. Similarly, the first three processes are kept going until the whole video data 101 and audio data 102 are captured, encoded and transformed into the disk file format 1041 and stored in the hard disk buffer 140. Then, the disk file format 1041 is recorded on a disk 130 through a disk writer 120 while the recording action is started. However, the change in FIG. 2B still does not reduce the time in the whole procedure since the recording action does not work with the capturing action in real time.

In view of the drawbacks mentioned with the prior art of continuously recording real-time data, there is a continued need to develop new and improved method and apparatus that overcome the disadvantages associated with the prior art of continuously recording real-time data. The advantages of this invention are that it solves the problems mentioned above.

SUMMARY OF THE INVENTION

In accordance with the present invention, a method and apparatus for performing continuous capture during recording real-time data substantially obviates one or more of the problems resulted from limitations and disadvantages of the prior art mentioned in the background.

Accordingly, one object of the present invention is to provide a method and apparatus for simultaneously capturing and recording real-time data.

Another object is to provide a method and apparatus for continuously capturing data during a real-time recording action being stopped.

Still another object is to provide a method and apparatus for performing seamlessly capturing and recording during recording real-time multiple disks data.

According to the aforementioned objects, the present invention provides a method for performing continuous capture during recording real-time data. The method includes (a) capturing and recording real-time data during a recording action being active and a buffer being empty of temporary data, wherein the temporary data further includes first temporary data and second temporary data; (b) capturing and storing the real-time data in the buffer as the first temporary data during the recording action being stopped; and (c) capturing and storing the real-time data in the buffer as the second temporary data during the first temporary data and the second temporary data being recorded at a high recording speed, wherein the high recording speed is faster than the speed of capturing the real-time data. By doing so, the recording action almost works with the capturing action at the same time and the real-time data is not lost anymore.

The present invention further discloses an apparatus for performing the method mentioned above. The apparatus includes an encoder encoding captured real-time data into a program stream; a disk authoring transforming the program stream into a disk file format; a disk writer recording the disk file format on an optical disk, wherein the disk writer further includes at least two recording speeds; a buffer temporarily storing the program stream or the disk file format during the disk writer stopping a recording action; and a sending-path controller notified by the disk writer for switching the data flow between directly recording and temporarily storing, wherein the sending-path controller also can notify the disk writer for switching the recording speeds.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figure 1:
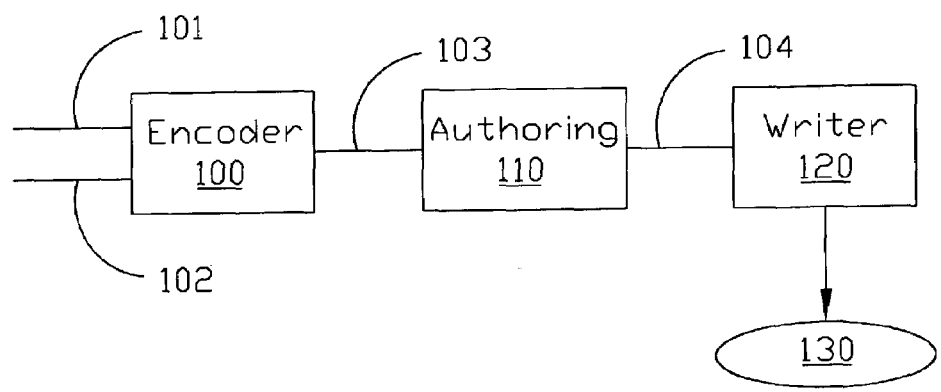
FIG. 1 illustrates a schematic well-known block diagram for recording real-time data.
Figure 2A:
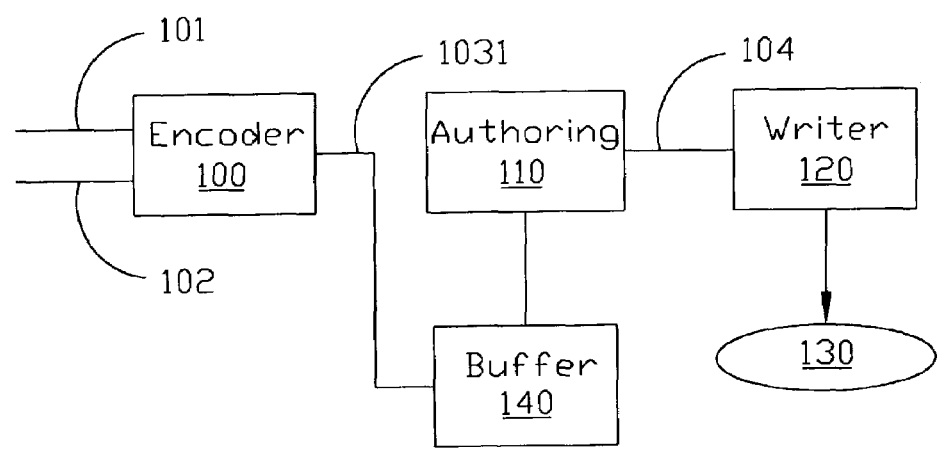
FIG. 2A illustrates a schematic well-known block diagram for seamlessly recording data.
Figure 2B:
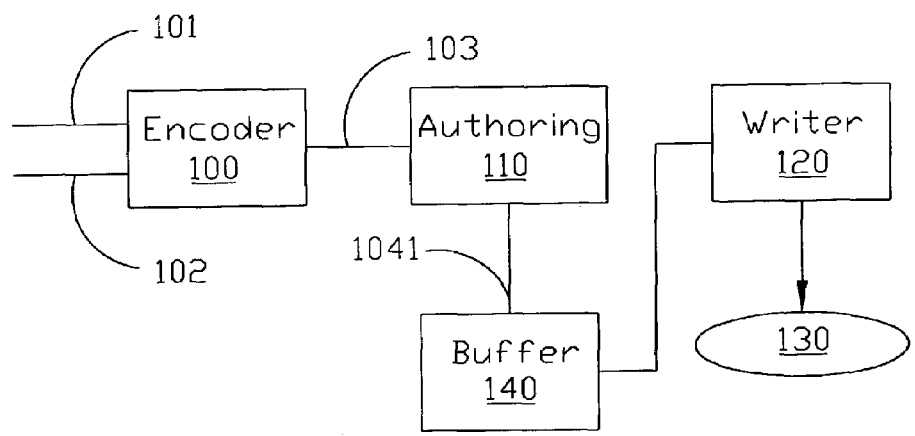
FIG. 2B illustrates another example block diagram of FIG. 2A for seamlessly recording data.
Figure 3A:
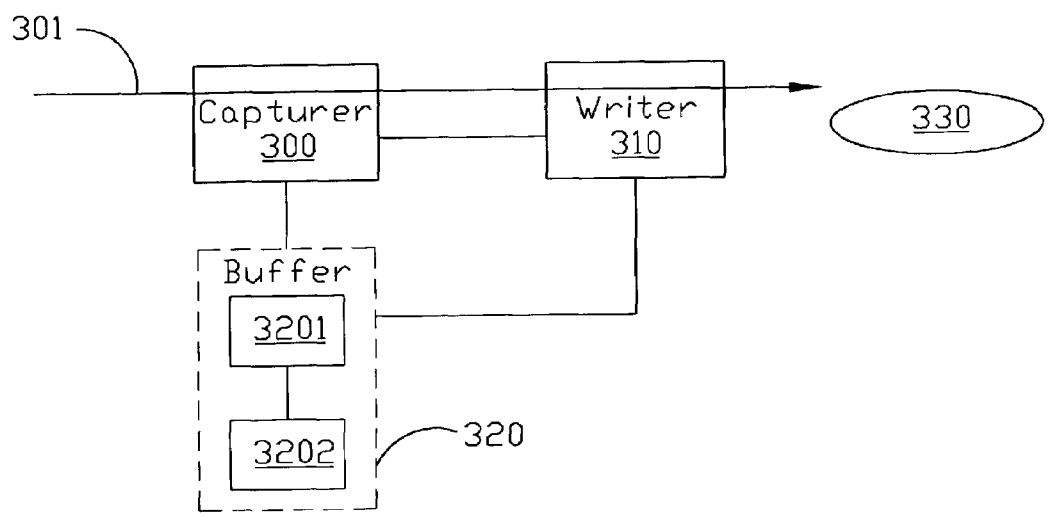
FIGS. 3A, 3B and 3C illustrate the real-time data flow path in accordance with the present invention in a schematic block diagram.

As shown in FIG. 3A, the data flow path during a recording action being active and a buffer being empty of temporary data is illustrated. Normally, the real-time data goes through a capturer 300 and a writer 310 along a data flow path 301 to be recorded on an optical disk 330 while a recording action is active and a buffer 320 is empty of temporary data. Wherein, this data flow path 301 is called directly recording and the real-time data also can include multiple disk data.

Figure 3B:
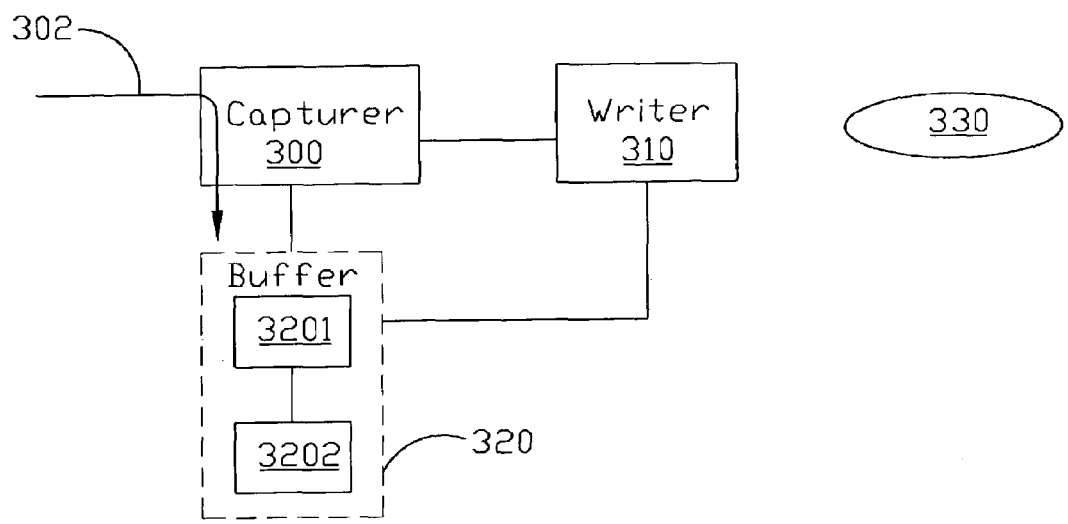

As shown in FIG. 3B, however, while the recording action is stopped, such as resulting from an optical disk 330 being full, finalize, and exchanged etc., the real-time data still goes through the capturer 300 along a data flow path 302 to be temporarily stored in the buffer 320 as the first temporary data. Wherein, the buffer 320 further includes a system memory 3201 for speeding up the storing action and a hard disk 3202 for extending the temporarily storing capacity. By doing so, the real-time data can be held during the recording action being interrupted or stopped.

Figure 3C:
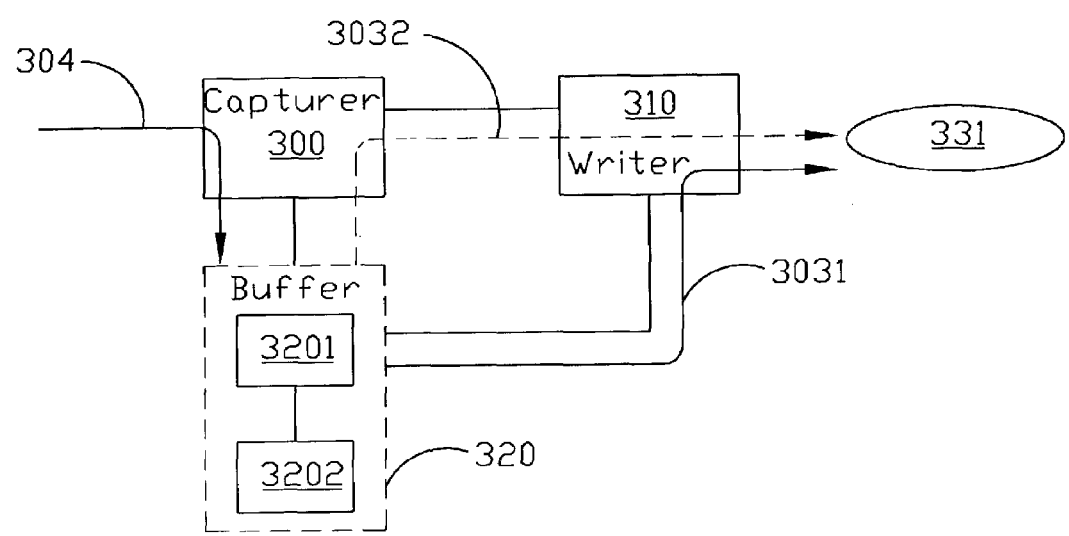

As shown in FIG. 3C, while the recording action is resumed, the first temporary data stored in the buffer 320 goes through the writer 310 along a data flow path 3031 (or 3032) to be recorded on an optical disk 331 at a high recording speed that is faster than the speed of capturing real-time data. At the same time, the real-time data still goes through the capturer 300 along a data flow path 304 to be temporarily stored in the buffer 320 as the second temporary data, and then the second temporary data also follows the first temporary data to be recorded at the high recording speed. Therefore, the buffer 320 gradually becomes empty due to the temporary data (first and second temporary data) is recorded at the high recording speed. Finally, the situation is the same as those in FIG. 3A and the recording speed is switched back to the normal recording speed.

Further, the optical disks 330 and 331 can be CD-R disks, CD-RW disks, DVD-R disks, DVD-RW disks, DVD+R disks, DVD+RW disks, or DVD-RAM disks etc. Therefore, the method should not be limited in one kind of video recorder, and can be utilized for all ones.

Figure 4A:
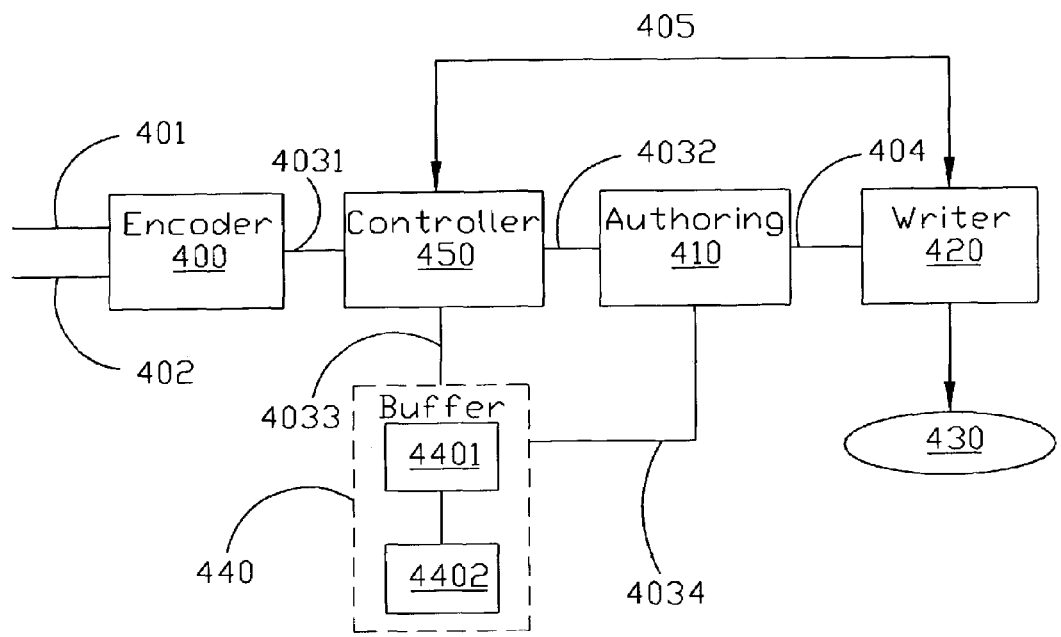
FIG. 4A illustrates one preferred embodiment block diagram in accordance with the present invention.

As shown in FIG. 4A, a preferred embodiment block diagram in accordance with the present invention for performing continuous capture during recording real-time data is illustrated. An encoder 400 encodes captured real-time video/audio data 401/402 into a program stream 4031, such as vide/audio MPEG file format. A disk authoring 410 transforms the program stream into a disk file format 404. A disk writer 420 records the disk file format 404 on an optical disk 430, wherein the disk writer 420 further includes at least two recording speeds. A buffer 440 stores the program stream during the disk writer 420 stopping the recording action, wherein the buffer 440 includes a system memory 4401 for speeding up the storing action and a hard disk 4402 for extending the storing capacity. A sending-path controller 450 receives the program stream from the encoder 400, transmitting the program stream to the disk authoring 410 while the optical disk 430 is not full and the buffer 440 is empty of the program stream, or transmits the program stream to the buffer 440 during the disk writer 420 being stopped recording, wherein the sending-path controller 450 is notified by the disk writer 420 through such as a direct signal line 405 or an application driver to switch data flow paths between 4032 and 4033.

The sending-path controller 450 further notifies the disk writer 420 through such as a direct signal line 405 or an application driver to switch the recording speed. For example, the sending-path controller 450 notifies the disk writer 420 to perform on the high recording speed while the program stream comes from the buffer 440 via the data flow path 4034, and notifies the disk writer 420 to perform on the normal recording speed while the program stream directly comes from the sending-path controller 450 via the data flow path 4032.

Figure 4B:
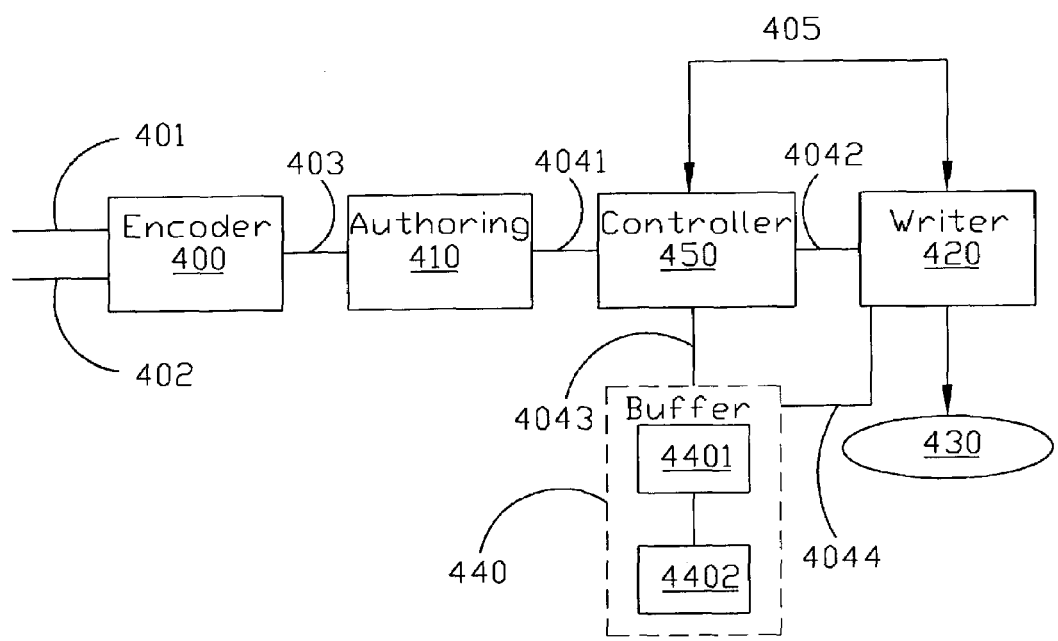
FIG. 4B illustrates another preferred embodiment block diagram in accordance with the present invention.

Another preferred embodiment block diagram in accordance with the present invention for performing continuous capture during recording real-time data is shown in FIG. 4B. An encoder 400 encodes the captured real-time video/audio data 401/402 into a program stream 403, such as video/audio MPEG file format. A disk authoring 410 transforms the program stream 403 into a disk file format 4041. A disk writer 420 records the disk file format on an optical disk 430, wherein the disk writer 420 further includes at least two recording speeds. A buffer 440 stores the disk file format during the disk writer 420 stopping the recording action, wherein the buffer 440 includes a system memory 4401 for speeding up the storing action and a hard disk 4402 for extending the storing capacity. A sending-path controller 450 receives the disk file format from the disk authoring 410, transmitting the disk file format to the disk writer 420 while the optical disk 430 is not full and the buffer 440 is empty of the disk file format, or transmits the disk file format to the buffer 440 during the disk writer 420 being stopped recording, wherein the sending-path controller 450 is notified by the disk writer 420 through such as a direct signal line 405 or an application driver to switch data flow paths between 4042 and 4043.

The sending-path controller 450 further notifies the disk writer 420 through such as a direct signal line 405 or an application driver to switch the recording speed. For example, the sending-path controller 450 notifies the disk writer 420 to perform the high recording speed while the disk file format comes from the buffer 440 via the data flow path 4044, and notifies the disk writer 420 to perform the normal recording speed while the disk file format directly comes from the sending-path controller 450 via the data flow path 4042.

Although specific embodiments have been illustrated and described, it will be obvious to those skilled in the art that various modifications may be made without departing from what is intended to be limited solely by the appended claims.

What is claimed is:

1. An apparatus for performing continuous capture during recording real-time data, said apparatus comprising: an encoder encoding captured real-time data into a program stream; a disk authoring transforming said program stream into a disk file format; a disk writer connecting with said disk authoring and recording said disk file format on an optical disk; a buffer connecting with said disk authoring and temporarily storing said program stream; and a sending-path controller having data inputs connecting with said encoder for receiving said program stream, having first data outputs connecting with said disk authoring for directly transmitting said program stream, and having second data outputs connecting with said buffer for temporarily storing said program stream, wherein said sending-path controller is notified by said disk writer to switch a data flow path between said first data outputs and said second data outputs.

2. The apparatus according to claim 1, wherein said buffer further comprises a system memory and a hard disk.

3. The apparatus according to claim 1, wherein said disk writer further has a high recording speed being faster than a normal recording speed thereof.

4. The apparatus according to claim 3, wherein said normal recording speed and said high recording speed are triggered by said sending-path controller.

5. The apparatus according to claim 4, wherein said normal recording speed is used for recording said disk file format transmitted from said sending-path controller.

6. The apparatus according to claim 4, wherein said high recording speed is used for recording said disk file format transmitted from said buffer.

7. The apparatus according to claim 1, wherein said disk writer notifies said sending-path controller to switch said data flow path from said disk authoring to said buffer while said disk writer stops recording.

8. The apparatus according to claim 1, wherein said disk writer notifies said sending-path controller to switch said data flow path from said buffer to said disk authoring while said buffer is empty of said program stream and said disk writer resumes recording.

9. An apparatus for performing continuous capture during recording real-time data, said apparatus comprising: an encoder encoding captured real-time data into a program stream; a disk authoring connecting with said encoder and transforming said program stream into a disk file format; a disk writer recording said disk file format on an optical disk; a buffer connecting with said disk writer and temporarily storing said disk file format; and a sending-path controller having data inputs connecting with said disk authoring for receiving said disk file format, having first data outputs connecting with said disk writer for directly transmitting said disk file format, and having second data outputs connecting with said buffer for temporarily storing said disk file format, wherein said sending-path controller is notified by said disk writer to switch a data flow path between said first data outputs and said second data outputs.

10. The apparatus according to claim 9, wherein said buffer further comprises a system memory and a hard disk.

11. The apparatus according to claim 9, wherein said disk writer further comprises a high recording speed being faster than a normal recording speed thereof.

12. The apparatus according to claim 11, wherein said normal recording speed and said high recording speed are triggered by said sending-path controller.

13. The apparatus according to claim 12, wherein said normal recording speed is used for recording said disk file format transmitted from said sending-path controller.

14. The apparatus according to claim 12, wherein said high recording speed is used for recording said disk file format transmitted from said buffer.

15. The apparatus according to claim 9, wherein said disk writer notifies said sending-path controller to switch said data flow path from said disk writer to said buffer while said disk writer stops recording.

16. The apparatus according to claim 9, wherein said disk writer notifies said sending-path controller to switch said data flow path from said buffer to said disk writer while said buffer is empty of said disk file format and said disk writer resumes recording.

* * * * *